S. G. HOWE.

CAR-BRAKE.

No. 6,724. Reissued Nov. 2, 1875.

Witnesses:

J. P. Theodore Lang.

Chas Slater

Inventor:

Solon G. Howe by Mason Fenwick & Lawrence

Attys.

N. PETERS, PHOTO-LITHOGRAPHER, WASHINGTON, D. C.

UNITED STATES PATENT OFFICE.

SOLON G. HOWE, OF DETROIT, MICHIGAN, ASSIGNOR TO HIMSELF AND JAMES W. CHENEY, OF SAME PLACE.

IMPROVEMENT IN CAR-BRAKES.

Specification forming part of Letters Patent No. 162,556, dated April 27, 1875; reissue No. 6,724, dated November 2, 1875; application filed October 5, 1875.

*To all whom it may concern:*

Figure 1:
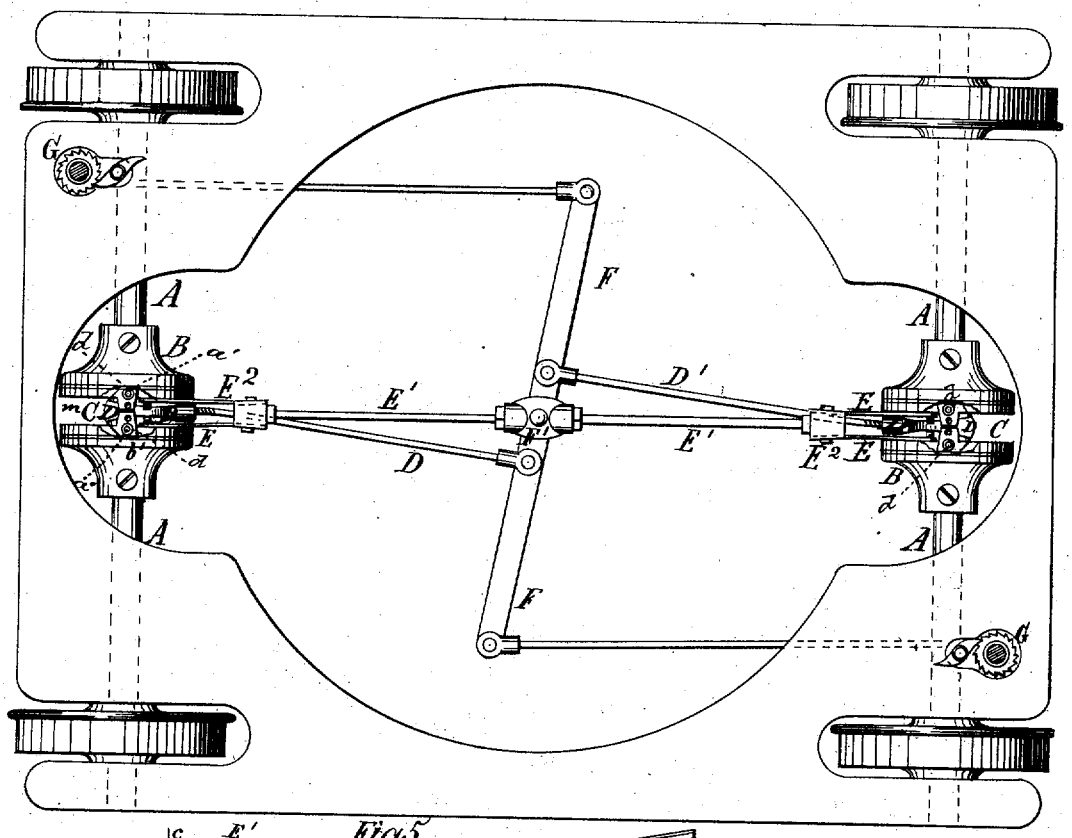
Figure 2:
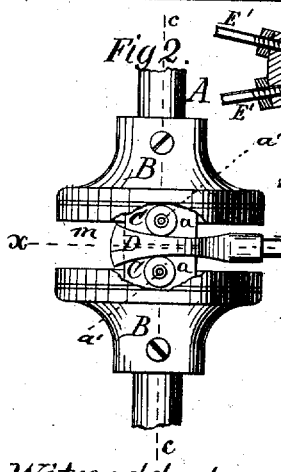
Figure 5:
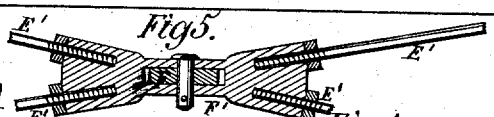
Figure 4:
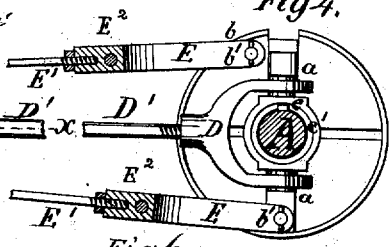
Figure 3:
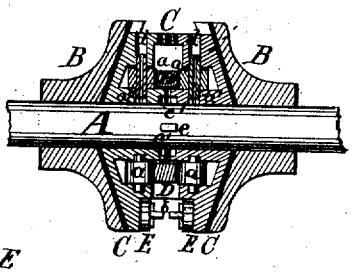
Figure 6:
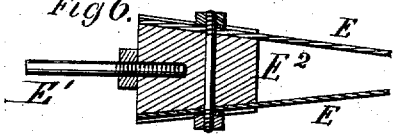

Be it known that I, SOLON G. HOWE, of Detroit, Wayne county, Michigan, have invented a new and Improved Car-Brake, of which the following is a specification:

Figure 1 represents a top view of the brake as applied to and in action upon the two axles of a street-car. Fig. 2 is a detail top view of the brake and a part of one of the car-axles, with portions of the conical shells and friction-cones broken out to expose the wedge-bail and friction-rollers. Fig. 3 is a detail vertical section lengthwise of the car-axle; and Fig. 4 is a similar section crosswise of the car-axle, in the line *x x* of Fig. 2. Fig. 5 is a vertical section through the fulcrum-block. Fig. 6 is a horizontal section of one of the tapering blocks with spring-braces fastened to it.

The nature of my invention consists in a friction-brake formed of two stationary hollow shells of conical form internally, and keyed apart in reverse positions on the axle of a car, and of two sliding friction-cones placed loosely on the axle between and within the shells, and capable of being moved in opposite directions from one another by proper levers and connections, when it is desired to bring the cones into frictional gear with the shells, and of being moved toward one another, when it is desired to break the said frictional connection of the cones with the shells.

By this construction the diameter of the aforesaid cones and shells can be quite small, as double the friction-surface obtained with brakes using but one cone and shell of the same diameter as my cone can be secured, and thus all inconvenience experienced from want of space or room in applying friction-brakes directly to the axle is avoided, and at the same time the requisite amount of friction for stopping the revolutions of the axle and the motion of the car secured.

My invention further consists in certain details of construction and combinations of parts, as hereinafter described and specifically claimed.

To enable others skilled in the art to make and use my invention, I will proceed to describe a practical way of doing the same.

A A represent the axles of a street or other car; B B and B′ B′, two pairs of shells of conical form internally, keyed on the respective axles. The shells of each pair are set with the bases of the cones facing one another, and with a space, *m*, between them. The interior surface of these shells is covered with a lining of leather, which is fastened by rivets, glue, or cement. Between these shells, and fitted loosely within the same, pairs of reversely-set friction-cones C C, which encircle the axle, are arranged. The cones of the respective pairs slide from and toward one another, and are kept from jamming against one another by means of a stop-pin, *e*, projecting from the axle, and entering an annular groove, *e′*, of the cones, formed by cutting a rabbet in the base of each of the cones, as shown.

These cones, instead of the shells being lined, may have their periphery covered with leather. The leather, whether placed on the inside of the shells or on the surface of the cones, serves to increase the friction, and when it becomes worn too much can be removed and replaced by a new lining or covering, as the case may be. These cones are of such diameter and length with respect to the size of the shells, and the distance that the shells are placed apart, that they are allowed sufficient play lengthwise of the axle to permit them to gear by frictional contact with the shells B B′ when the car is to be stopped, and to become ungeared from the shells when the car is to be started.

For operating the cones a wedge, D, in form of a bail, and spring-braces E E, are provided; and, to prevent too great wear and friction from the use of the wedge, friction-rollers *a a* are inserted into the base of each of the cones at those places where the ends of the bail pass between the cones, and the axles of the top friction-rollers are bored through from end to end, so that while the rollers are being lubricated oil shall be conducted to the axle and friction-cones, and thus the sliding motion of the friction-cones prevented from wearing the axle too much.

The friction-rollers are to be fitted in half-boxes of the cones, and held in place by half-box screw-plates, or in any other proper and well-known way of applying friction-rollers in the mechanic arts. The upper ends of the axles of the upper rollers are made shorter than the boxes in which they turn, in order that oil-chambers *d* may be left beyond these ends for the reception of oil for lubricating the rollers and cones. The spring-braces E are flat bars, and their retracting power is produced by seating one end of each of the bars against the tapering side of a block, $E^2$, and fastening the said end by a screw-bolt. This manner of attaching one of the ends of each of the bars causes their other ends to converge toward one another, and said ends, being attached to the cones, while thus converged, will, when the cones are forced apart, always tend to draw the cones back to their normal position, and when the cones are released the bars will instantly return them to said normal position. The tapering seats for the spring-bars are formed between flanges of the blocks $E^2$, and, therefore, the spring-bars, when fastened by the screw-bolts, will be prevented, by the flanges and the bolts together, from moving up and down.

In the drawings a car with two axles, and two pairs of shells on the axles, and two pairs of reversely-set cones, connected by levers and rods and spring-braces, is shown. Each pair of cones has a pair of spring-braces above and below the axle, and each pair of braces is attached to a block, $E^2$, one pair above the other.

In such an application of the invention, which is given as a simple and practical illustration of its manner of use, two reversely-set bails and four blocks, $E^2$, each with a pair of spring-braces attached to it, are employed for operating upon the friction-cones. The bail and braces act upon the cones above and below the axle, and thus, the force upon the cones being balanced, the cones move truly, back and forth, on the axle. The bails are connected together by rods $D'$ $D'$ and a centrally-pivoted lever, F, and the spring-braces by the blocks $E^2$ $E^2$ $E^2$ $E^2$, rods E $E^1$, and the head and fulcrum-block $F'$, to which latter block the lever F is pivoted, while its outer ends are connected, by rods and chains, with the usual hand-wheels and ratchet-shafts G G on the platforms at both ends of the car.

The rods are screw-threaded, and may be provided with jam-nuts, in order that their length may be adjusted as occasion may require.

The operation is as follows: The ratchet-shafts being turned, the lever F is vibrated, and the rods $D'$ $D'$ moved in reverse directions. This causes the reverse wedges of the bails to impinge against the friction-rollers of the respective pairs of cones, and as the wedge-bails gradually move between the friction-rollers, the friction-cones of each pair are forced apart into the conical shells until the cones and shells bind so firmly against one another that the revolution of the car-axle is stopped. As the cones are moved apart one end of the spring-braces is forced along with them, and thus spring-power is accumulated, which, on the release of the cones by withdrawing the force from the ratchet-shafts G G, causes the cones to automatically ungear themselves from the shells, and permit the car-axle to again revolve.

During the operation of the brake the spring-braces stay the cones above and below the axle, and prevent them from turning.

It is evident from the foregoing description that one or two pairs of cones and shells may be used on a car, the parts on either side of the fulcrum of the lever F being wholly independent of one another, and are only represented as connected to the one lever F as a convenient and cheap manner of applying the invention when two axles are to be stopped simultaneously.

What I claim is—

1. In a brake, the combination of a pair of reversely-set conical shells and a pair of reversely-set cones, suitable mechanism for simultaneously moving the cones apart and toward one another, and an axle, substantially as and for the purpose described.

2. In a brake, the wedged-shaped bail, in combination with the pair of reversely-set cones, a pair of reversely-set conical shells, and an axle, substantially as and for the purpose described.

3. The sliding friction-cones, provided with friction-rollers, in combination with a wedge, to act thereon for pressing the cones against the shells, substantially as and for the purpose set forth.

4. The combination, with the car-axle, of the center-pins of the upper friction-rollers of the cones, having oil-channels through them for lubricating the axle, cones, and rollers, substantially as described.

5. The converging spring-braces E E, in combination with the sliding cones and the tapering blocks $E^2$, for the purpose of preventing the cones turning, permitting them to slide apart, and for returning them to their original position, substantially as and for the purpose described.

6. The combination of the pair of sliding cones, having an annular groove formed between them, a pair of shells, and the axle, having the stop-pin *e*, or its equivalent, substantially as and for the purposes described.

7. The combination of a pair of friction-cones, a pair of conical shells, and two pair of spring-braces, attached to the cones above and below the car-axle and to the blocks $E^2$ and $F'$, substantially as and for the purpose set forth.

SOLON G. HOWE.

In presence of—
E. CHENEY,
WM. V. GAWLEY.